United States Patent [19]
Krajewski

[11] Patent Number: 4,572,610
[45] Date of Patent: Feb. 25, 1986

[54] OPTICAL FIBER BUFFER COATED WITH HALOGENATED DIHYDROXY-TERMINATED POLYBUTADIENES

[75] Inventor: John J. Krajewski, Wheeling, Ill.

[73] Assignee: DeSoto, Inc., Des Plaines, Ill.

[21] Appl. No.: 612,426

[22] Filed: May 21, 1984

[51] Int. Cl.$^4$ .............................................. G02B 5/16
[52] U.S. Cl. ................................ 350/96.34; 428/375; 428/392
[58] Field of Search ............... 428/375, 392, 378; 350/96.3, 96.23, 96.34; 525/454, 278, 920, 922; 526/301; 528/59, 65, 75; 204/159.11, 159.19, 159.23

[56] References Cited

U.S. PATENT DOCUMENTS 3,962,514 6/1976 Rittler ..................................... 501/10
4,472,019 9/1984 Bishop et al. ....................... 350/96.3

FOREIGN PATENT DOCUMENTS 69363 12/1983 European Pat. Off. .

Primary Examiner—Lorraine T. Kendell
Attorney, Agent, or Firm—Dressler, Goldsmith, Shore, Sutker & Milnamow, Ltd.

[57] ABSTRACT

A radiation-curable diethylenically unsaturated polyurethane resin is disclosed which cures to provide cured coatings possessing reasonable physical integrity at room temperature, a tensile modulus of less than about 10000 psi at $-40°$ C., preferably less than 5000 psi at $-60°$ C., and a high index of refraction, above 1.48. This polyurethane resin is constituted by an essentially saturated, halogenated, dihydroxy-terminated linear liquid polybutadiene polymer, in which the halogen is preferably chlorine, reacted with an organic diisocyanate and a monoethylenically unsaturated monomer carrying a single hydroxy group to form a diethylenic diurethane having a halogen-containing essentially saturated polybutadiene backbone. Coating compositions are disclosed which consist essentially of the above diethylenically unsaturated diurethane having a polybutadiene backbone together with less than 40% of a liquid solvent therefor which is preferably a monoethylenically unsaturated liquid having a low glass transition temperature, and the compositions preferably include a photoinitiator enabling cure on ultraviolet exposure. These coatings are used as a buffer coating on optical glass fiber.

9 Claims, No Drawings

OPTICAL FIBER BUFFER COATED WITH HALOGENATED DIHYDROXY-TERMINATED POLYBUTADIENES

DESCRIPTION

1. Technical Field

This invention relates to radiation-curable resins, coating compositions containing the same, and to buffer coatings for optical glass fiber which possess low tensile modulus at low temperature, a high index of refraction, and which are stable on elevated temperature exposure.

2. Background Art

Radiation-curable coatings, and especially ultraviolet-cured coatings, are particularly desirable for the coating of optical fibers because they can be rapidly applied and rapidly cured upon the freshly drawn fiber as part of the fiber's production and before that fiber can be abraded by contact with other fibers. Unfortunately, the low temperature properties of these radiation-cured coatings has presented a considerable problem.

The radiation-curable coatings initially provided were much too hard. As a result, as the service temperature was reduced below room temperature, stress-induced microbending of the coated fiber was encountered. These microbends impair the ability of the fibers to serve as a wave guide. This inability to sustain even moderately low service temperature caused the ultraviolet-cured coatings initially provided by industry to be limited to experimental applications.

The first commercially successful optical fiber coating known to me was provided by my coworker, R. E. Ansel in application Ser. No. 170,148 filed July 18, 1980. The acrylated polyurethane-type coating systems provided in that application combine a reasonably rapid ultraviolet cure with good adhesion to the glass surface of the fiber with a low tensile modulus such that reasonable microbending resistance at moderately low temperature was achieved.

In many instances it is desired to have the optical glass fiber serve at extremely low temperatures down to about $-60°$ C., and the Ansel compositions have too high a tensile modulus to adequately avoid microbending problems under such severe service conditions. It has been quite difficult to provide a radiation-cured coating which would be soft enough to resist microbending at very low service temperature while still possessing minimal physical integrity at room temperature, but my coworkers have made progress in that direction as set forth in application Ser. No. 398,161 filed July 19, 1982 in the names of R. E. Ansel, O. R. Cutler and E. P. Moschovis.

Silicone carbinol-based polyurethane diacrylates have been developed by our coworkers and have shown promise in providing good optical fiber coatings. However, it is preferable to use a coating having a refractive index higher than the refractive index of the glass at the surface of the fiber. At this time this means a refractive index above 1.48. The silicone carbinol-based materials have not possessed a high enough refractive index, and this has limited their utility.

Acrylate-containing compounds based on dihydroxy-terminated polybutadienes have also been tried, and have shown desirable low temperature modulus combined with a high refractive index. Unfortunately, these desirable characteristics are not maintained with time. Heat ageing causes a marked change in properties, namely: a progressive hardening of the coating and a progressive lowering in its initially high refractive index.

This invention has, as its objective, to retain the remarkable properties provided by polybutadiene polyurethane diacrylates, while overcoming the heat instability of these materials which has prevented them from being acceptable in commerce.

DISCLOSURE OF INVENTION

In accordance with this invention, a radiation-curable diethylenically unsaturated polyurethane resin is provided which cures, either alone or in the presence of up to about 40%, based on the total weight of polymerizable material, of monoethylenically unsaturated monomer having a $T_g$ below about 20° C., preferably below 0° C., to provide a solid, non-flowable cross-linked film at room temperature, a low tensile modulus at low temperature of less than about 10000 psi at $-40°$ C., preferably less than about 5000 psi at $-60°$ C., and an index of refraction above 1.48. This is accomplished by reacting a dihydroxy-terminated liquid polybutadiene polymer with a halogen (fluorine, chlorine, bromine and iodine), but preferably with chlorine, to consume the residual unsaturation in the polybutadiene polymer. This provides an essentially saturated, halogenated, dihydroxy-terminated linear polybutadiene polymer which is reacted with an organic diisocyanate and a monoethylenically unsaturated monomer carrying a single hydroxy group to form a diethylenic polyurethane having a halogen-containing essentially saturated polybutadiene backbone. These diethylenic polyurethanes can be cured with ultraviolet light, or other radiation like electron beam radiation, and the cured coatings are solid, nonflowable cross-linked films at room temperature having a low tensile modulus at low service temperature, as above defined, and they have a high index of refraction above 1.48.

$T_g$ identifies the glass transition temperature which is obtained from a homopolymer of the monomer. This is a conventional identification.

With the unsaturation removed from the polybutadiene backbone, the heat instability previously encountered is avoided. The removal of unsaturation and the introduction of halogen atoms does not lower the desirable high refractive index, it does not disturb the desired ultraviolet cure, and it does not introduce undesired brittleness. As a result, the diethylenic polyurethanes of this invention are particularly useful in liquid coating compositions to be applied and radiation (ultraviolet) cured on optical glass fiber to provide prime or buffer coatings thereon.

Dihydroxy-terminated polybutadiene polymers are known products which are available in commerce. These are liquid polybutadienes having one hydroxy terminal group at each end thereof. A suitable commercially available product of this character will be illustrated in the examples. The butadiene which is anionically polymerized may include a minor proportion of isoprene, styrene, or other unsaturated anionically polymerizable monomer, which does not change the overall nature of the polybutadiene polymer. Thus, 5% of isoprene or styrene can be accomodated easily, and up to about 25% may be present.

The halogenation of the residual unsaturation in an unsaturated polybutadiene polymer is also a conventional reaction, a typical chlorination reaction being illustrated in the examples. All that is needed is to carry out the halogenation reaction until at least 80%, preferably at least 90%, of the unsaturation initially present has been consumed, and this can be determined by calculation from the amount of halogen which is absorbed. The product is then essentially saturated.

The reaction of the halogenated dihydroxy-terminated polybutadiene with diisocyanate and monoethylenic monomer carrying a single hydroxy group can be in any order, as is well known. Thus, one can react the halogenated, dihydroxy-terminated, polybutadiene polymer with two moles of diisocyanate per hydroxy equivalent, and then react the isocyanate-functional product with the hydroxy monomer. One can also react the diisocyanate with one molar proportion of the hydroxy monomer to form a monoethylenic mono-isocyanate which is then reacted in stoichiometric proportion with the hydroxy functionality on the halogenated, dihydroxy-terminated, polybutadiene polymer. Both procedures for providing ethylenically unsaturated derivatives of hydroxy-functional oligomers are well known.

The diisocyanates whch may be used form a well known class of materials which are here illustrated by 2,4-toluene diisocyanate and isophorone diisocyanate.

The hydroxy monomers which may be used are also well known, and are preferably acrylates, like 2-hydroxyethyl acrylate. Similar hydroxyalkyl esters of acrylic acid are also useful, such as 2-hydroxypropyl acrylate or 2-hydroxybutyl acrylate. The corresponding methacrylates are useful, but less preferred when ultraviolet cures are intended because these are less rapidly responsive to the curing radiation.

Coating compositions in accordance with this invention will consist essentially of the halogenated dihydroxy-functional polybutadiene which has been reacted to add an ethylenically unsaturated group (preferably containing acrylate unsaturation) onto the hydroxy functionality together with sufficient liquid solvent to provide an appropriate coating viscosity. In some instances the polybutadiene is of sufficiently low molecular weight such that no additional liquid is needed, but in most instances one will have some liquid solvent present. Heat can be used to reduce the viscosity, so the solution at room temperature can be more viscous than can be coated directly. This liquid solvent is preferably ethylenically unsaturated, and most preferably monoethylenically unsaturated, and is desirably used in an amount of less than 40% of the coating composition, more preferably less than 35% of the coating composition, so as to provide minimum modification in the unique properties of the halogenated polybutadiene derivatives which are relied upon herein.

While volatile solvents, such as acetone, can be used, application onto optical glass fiber is preferably carried out in the absence of any volatile component, so ethylenically unsaturated liquids are preferred, and these may be of various type so long as they are reactive when irradiated and high boiling. Suitable monomers are illustrated by 2-hydroxyethyl acrylate, phenoxyethyl acrylate, dimethyl acrylamide, N-vinyl pyrrolidone, isobornyl acrylate, methyl acrylate, ethoxyethoxyethyl acrylate and dicylopentenyl acrylate. It is preferred to employ monomers having a $T_g$ below 20° C., preferably below 0° C. to maintain the softness of the cured film. Other liquid monomers which are useful are the methacrylate counterparts of the acrylates noted above. These are less rapidly reactive.

The radiation which will effect cure will vary with the photoinitiator used. The usual photoinitiators are ketonic, such as about 3% of diethoxy acetophenone. Other photoinitiators are illustrated by acetophenone, benzophenone, m-chloro acetophenone, propiophenone, thioxanthone, benzoin, benzil, anthraquinone, and the like. These photoinitiators may be used singly or in mixtures, and are present in an amount up to about 10% of the coating (usually 1-5%) to assist ultraviolet cure. Various amines may also be added to enhance the cure, such as diethyl amine, but this is not essential.

Even visible light not too remote from the ultraviolet range may be employed using appropriate photoinitiators to effect cure upon radiation exposure. These are illustrated by camphor quinone and coumarin which are used together with a tertiary amine, such as triethyl amine. Diphenylbenzoylphosphine is also useful in and near the ultraviolet range.

Throughout this application, including the examples and claims which follow, all parts and proportions are by weight, unless otherwise stated.

It will be appreciated that cured resins having the room temperature softness obtained herein are of little value for normal coating purpose.

It will also be understood that the cured coatings provided in this invention, though solid and nonflowable, are quite soft at room temperature. As a result, these cured coatings will frequently be overcoated with topcoats which are physically stronger to provide desired abrasion resistance, though these topcoats are too hard and stiff to be used in direct contact with the glass. These topcoats are themselves well known, and form no part of this invention.

This invention is illustrated by the following examples:

EXAMPLE 1

(Production of Chlorinated Dihydroxy-Terminated Liquid Polybutadiene)

A one liter, 3 neck round bottom flask, equipped with a stirrer, thermometer, gas fritted tip bubble tube, condensor and heating mantel was charged with 1000 grams of chloroform and 280 grams (0.1 moles) of dihydroxy-terminated liquid polybutadiene (Arco product Poly BD R45HT). The chloroform solution was stirred and heated to 60° C. where the temperature was held during the addition of chlorine gas through the bubble tube. The chlorine gas was introduced beneath the surface of the solution in the flask at a rate of about 30 cc/minute until 183 grams of chlorine had been absorbed.

The resulting solution was cooled to room temperature and washed by agitating it with 100 ml. of water and then removing the water by decantation. This washing was carried out three times. The chloroform was then removed by distillation, first at ambient pressure and then at reduced pressure (using an aspirator) to yield 463 grams of an oily residue constituted by a chlorinated dihydroxy-terminated polybutadiene.

EXAMPLE 2

(Isophorone Diisocyanate Mono Hydroxyethyl Acrylate Condensate)

Into a reaction vessel fitted with a stirrer and gas inlet tube is placed one mole (222 g) of isophorone diisocyanate. To the reaction vessel was next added 0.2% by weight of dibutyltin dilaurate catalyst and 0.05% by weight of phenothiazine based on the total weight of reactants. The mixture is then blanketed with dry nitrogen gas and one mole (116 gram) of 2-hydroxyethyl acrylate is added over a period of from 4 to 5 hours while maintaining the temperature in the range of 25°-30° C., cooling being used when needed. This temperature is maintained for one hour after acrylate addition is complete.

EXAMPLE 3

(Production of Acrylate Functionalized Chlorinated Polybutadiene)

One mole of the unsaturated monoisocyanate produced in Example 2 is added slowly to 0.5 moles (89.5 grams) of the dihydroxy-terminated chlorinated polybutadiene prepared in Example 1 which is placed in a reaction vessel and heated to 60° C. Upon completion of the unsaturated monoisocyanate addition, the reaction is continued at the stated temperature until no free isocyanate remains.

The resultant product is a soft waxy cloudy diethylenically unsaturated solid which may be dissolved in a liquid solvent to produce a radiation curable coating composition. This liquid solvent may be constituted by an inert volatile organic solvent, such as acetone, or by an ethylenically unsaturated monomer which will polymerize with the unsaturated product of this example. In this way, the volatile content of the coating composition can be minimized or eliminated, as is well known. These unsaturated monomers may be monoethylenic, such as methyl acrylate or 2-hydroxyethyl acrylate, or they may be polyethylenic, such as trimethylol propane di- or tri-acrylate, or pentaerthyritol tri-acrylate.

EXAMPLE 4

The polymer of Example 1 (284.6 grams) was redissolved in 171.7 grams of methyl ethyl ketone and the solution was poured into a two liter four-necked round bottom flask fitted with a dry air blanket, stirrer, thermometer, heating mantle, and a 100 milliliter dropping funnel. Phenothiazine (0.16 gram) and dibutyltin dilaurate (0.35 gram) were added to the solution. The isophorone diisocyanate-2-hydroxyethyl acrylate 1:1 adduct (27.6 gram) of Example 2 was dissolved in 66.2 grams methyl ethyl ketone and added to the dropping funnel. The contents in the dropping funnel were added dropwise to the polymer solution at 60° C. over a period of 90 minutes. The solution was stirred at 55° C. for twenty-four hours. After sitting at 23° C. for 5½ days, 10.7 grams 2-hydroxyethyl acrylate were added to lower the NCO content which was measured by infrared spectroscopy. This solution was stirred at 60° C. for five hours. Additional tin catalyst (0.35 gram) was added, and then stirred for four hours with only a slight loss in NCO content. After sitting overnight at 23° C., 0.35 gram of catalyst was again added and the mixture stirred at 60° C. for four hours. Since the NCO level had remained essentially constant, 43.1 grams of methanol were added, which depleted the remaining isocyanate in three hours. Ethoxyethoxyethyl acrylate (109.4 grams) was added as an ultraviolet curable diluent, and the solvents were removed at 60° C. down to 53 millimeters of mercury vacuum. The resultant product was mixed with 3% by weight of Irgacure 651 photoinitiator (phenyl dimethoxyacetophenone), drawn-down on glass, and cured under ultraviolet light. The cure required only one pass on a unit with two 300 watt/inch lamps at a belt speed of 20 ft/min.

The cured film was examined and found to be tack-free, soft and elastic, and self-extinguishing when ignited. The coating has good moisture resistance, a low modulus, and an index of refraction above 1.48.

EXAMPLE 5

The coating solution of Example 4 is applied to freshly formed optical fiber in the conventional fashion to form a buffer coating. The ultraviolet cured buffer-coated fiber resists microbending down to about −60° C.

What is claimed is:

1. An optical glass fiber buffer coated with an ultraviolet-cured coating of a coating composition consisting essentially of a radiation-curable diethylenically unsaturated polyurethane resin which cures to provide cured coatings which are solid, nonflowable and cross-linked at room temperature, have a low tensile modulus at low service temperature, and have a high index of refraction above 1.48, constituted by the diethylenic diurethane reaction product of an essentially saturated, halogenated, dihydroxy-terminated linear liquid polybutadiene polymer, an organic diisocyanate, and a monoethylenically unsaturated monomer carrying a single hydroxy group, less than 40% of a liquid solvent therefor, and a photoinitiator enabling said composition to cure on ultraviolet light exposure.

2. An optical glass fiber as recited in claim 1 in which said tensile modulus is less than about 10000 psi at −40° C.

3. An optical glass fiber as recited in claim 1 in which said tensile modulus is less than about 5000 psi at −60° C.

4. An optical glass fiber resin as recited in claim 2 in which said halogen is chlorine.

5. An optical glass fiber as recited in claim 1 in which said liquid solvent is an ethylenically unsaturated liquid.

6. An optical glass fiber as recited in claim 5 in which said liquid solvent is a monoethylenically unsaturated liquid.

7. An optical glass fiber as recited in claim 6 in which said composition contains a photoinitiator enabling said coating to cure on ultraviolet exposure.

8. An optical glass fiber as recited in claim 6 in which said monoethylenically unsaturated liquid has a $T_g$ below 0° C. and is present in an amount less than 35%.

9. An optical glass fiber as recited in claim 1 in which said buffer coating is topcoated.

* * * * *